(12) United States Patent
Pal et al.

(10) Patent No.: US 10,594,640 B2
(45) Date of Patent: Mar. 17, 2020

(54) MESSAGE CLASSIFICATION

(71) Applicant: Yahoo!, Inc., Sunnyvale, CA (US)

(72) Inventors: David Pal, New York, NY (US);
Satyen Chandrakant Kale, New York, NY (US); Yongxin Xi, San Jose, CA (US); Ilambharathi Kanniah, Sunnyvale, CA (US); Yuval Peduel, Sunnyvale, CA (US); Zohar Shay Karnin, Hoboken, NJ (US); Jyh-Shin Shue, Cupertino, CA (US)

(73) Assignee: Oath Inc., New York, NY (US)

( * ) Notice: Subject to any disclaimer, the term of this patent is extended or adjusted under 35 U.S.C. 154(b) by 468 days.

(21) Appl. No.: 15/366,443

(22) Filed: Dec. 1, 2016

(65) Prior Publication Data

US 2018/0159808 A1    Jun. 7, 2018

(51) Int. Cl.
*H04L 12/58*    (2006.01)

(52) U.S. Cl.
CPC .............. *H04L 51/12* (2013.01); *H04L 51/22* (2013.01)

(58) Field of Classification Search
CPC .......... H04L 51/12; H04L 51/14; H04L 51/22
See application file for complete search history.

(56) References Cited

U.S. PATENT DOCUMENTS

| | | | | |
|---|---|---|---|---|
| 6,092,103 A * | 7/2000 | Pritsch | .................... | H04L 51/22 370/392 |
| 7,089,241 B1 * | 8/2006 | Alspector | ............ | G06Q 10/107 |
| 7,543,053 B2 * | 6/2009 | Goodman | ............ | G06Q 10/107 709/206 |
| 7,574,409 B2 * | 8/2009 | Patinkin | ............... | G06Q 10/107 706/12 |
| 7,693,945 B1 * | 4/2010 | Dulitz | .................... | H04L 51/12 709/206 |
| 7,899,871 B1 * | 3/2011 | Kumar | .................... | H04L 51/16 709/206 |
| 7,930,353 B2 * | 4/2011 | Chickering | ............. | H04L 51/12 709/206 |
| 8,489,689 B1 * | 7/2013 | Sharma | ................ | G06Q 10/107 709/206 |
| 8,819,142 B1 * | 8/2014 | Golub | .................... | H04L 51/12 709/206 |
| 9,087,324 B2 * | 7/2015 | Osipkov | .............. | G06Q 10/107 |

(Continued)

*Primary Examiner* — Patrice L Winder
(74) *Attorney, Agent, or Firm* — Cooper Legal Group, LLC (57) ABSTRACT

One or more computing devices, systems, and/or methods for message classification are provided. For example, a set of messages is clustered into a set of clusters. A cluster comprises messages with similar features (e.g., similar subject lines, message body content, sender information, recipient information, structure, user action such as reading or deleting, spam vote information, etc.). Cluster features are computed for the clusters based upon features of messages within such clusters. A first table, comprising cluster entries corresponding cluster features of clusters, and a second table, comprising message entries corresponding to clusters to which messages are assigned, are created. Message features of a message are created, using the first table and second table, based upon features of the message and cluster features of clusters to which the message is assigned. A message classifier is used to classify the message (e.g., spam, safe, a threat, etc.) based upon the message features.

20 Claims, 9 Drawing Sheets

(56) References Cited

U.S. PATENT DOCUMENTS

| | | | | |
|---|---|---|---|---|
| 9,152,953 B2* | 10/2015 | Lai | .................. | G06Q 10/107 |
| 9,813,367 B2* | 11/2017 | Ryan | .................. | H04L 51/12 |
| 2005/0060643 A1* | 3/2005 | Glass | .................. | G06F 17/241 |
| | | | | 715/205 |
| 2010/0082749 A1 | 4/2010 | Wei et al. | | |
| 2015/0295869 A1* | 10/2015 | Li | .................. | H04L 51/12 |
| | | | | 709/206 |

\* cited by examiner

FIG. 6

MESSAGE CLASSIFICATION

BACKGROUND

Many users may exchange messages through messaging services, such as email, social network messaging, text messaging, etc. A message account of a user with a messaging service may provide a messaging interface with various message folders, such as an inbox, a deleted folder, a spam folder, a sent folder, etc. In this way, the user may receive, read, and send messages through the messaging interface, and such messages may be stored within the appropriate message folders. In an example, the user may send work messages to co-workers, personal messages to friends, etc. through the messaging interface. In another example, the user may receive work messages, personal messages, newsletters, advertising messages, etc. through the messaging interface.

Unfortunately, the user may receive unsolicited messages with undesirable content, such as offensive or unwanted content, referred to as spam. Many spam filters may attempt to recognize normal ongoing spam campaigns from spammers who have been around awhile, that use the same known malicious content, that use the same internet protocol (IP) addresses that have been blacklisted, etc. However, some spammers may hijack new IP address ranges, use bot nets, buy new domains through which to send spam, use randomized malicious content, use variations in subjects, etc. in order to launch unusual and/or sudden spam attacks that will not be recognized by spam filters until after harm has been done because by the time enough spam votes are received for a spam classifier to learn a bad reputation, the spam attack may have already affected numerous users. Because such attacks use randomized or differing subjects, content, sender credentials, etc. no single feature will reveal the complete spam campaign. Thus, security of users may become compromised such as where users read and/or take action (e.g., click on a link to malicious content) with regard to the spam. Also, users may become frustrated when their inbox is inundated with such spam.

SUMMARY

In accordance with the present disclosure, one or more computing devices and/or methods for message classification are provided. For example, a set of messages may be transformed into a set of bags of words. A bag of words may correspond to a message component (e.g., a subject line bag of words comprising words within a subject of a message; an email body bag of words comprising words within an email body of the message; etc.). The set of bags of words may be transformed into a set of hash descriptions using a hash function. For example, each bag of words may be transformed into a min-hash description based upon a number of words (e.g., 5 words or any other number of words) having a minimum hash value. The set of hash descriptions may be grouped (e.g., using a map-reduce framework for improved computation processing) to cluster messages of the set of messages into a set of clusters. The set of clusters may cluster messages according to a subject line space, a sender space, a content space, a user action space, an extensible markup language (XML) document object model (DOM) structure space for message body content, etc. For example, messages with similar content may be grouped into a first cluster, messages with similar subject lines may be grouped into a second cluster, messages that users deleted before reading may be grouped into a third cluster, etc.

Cluster features may be computed for clusters within the set of clusters based upon features of messages within the clusters. A cluster feature may correspond to an aggregation of spam scores for messages within a cluster, recipient characteristic features of recipients of the messages (e.g., age, location, social network profile data, a frequency of accessing messages, etc.), user action features performed upon the messages by the recipients (e.g., reading a message, deleting a messages without first reading the message, voting a message as spam, forwarding a message, replying to a message, and/or other actions indicating whether the user had interest in the message or might have felt the message was not desirable such as spam), message content features of the messages (e.g., grammar, spelling, word choice, embedded links, embedded images, a topic of the message content, word count, paragraph/sentence structure, etc.), attachment features of the messages (e.g., a topic of an attachment), subject line features of the messages (e.g., spelling, grammar, sentence structure, word count, etc.), etc.

A first table comprising cluster entries for the set of clusters may be created. The first table may comprise a first cluster entry corresponding to a first cluster and cluster features of the first cluster. A second table comprising message entries for the set of messages may be created. The second table may comprise a first message entry corresponding to a first message and identifiers of clusters to which the first message is assigned. Message features for a message (e.g., a message within a message inbox) may be created, using the first table and the second table (e.g., the second table may be used to identify clusters to which the message is assigned, and the first table may be used to identify cluster features of those clusters to which the message is assigned, which may be used as message features), based upon features of the message and cluster features of clusters to which the message is assigned. A message classifier (e.g., trained to use a learned decision rule for classifying messages as spam, a threat, personal, work, etc. that is learned based upon a set of training message data labeled based upon spam vote information for the set of training messages) may be used to classify the message based upon the message features. For example, the message may be retroactively classified (e.g., classified and moved to a spam folder after the message was already delivered to the message inbox). In another example, clusters of messages may be retained and updated as new messages are intercepted by a messaging service, and thus a new message may be classified and/or filtered before reaching the message inbox.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
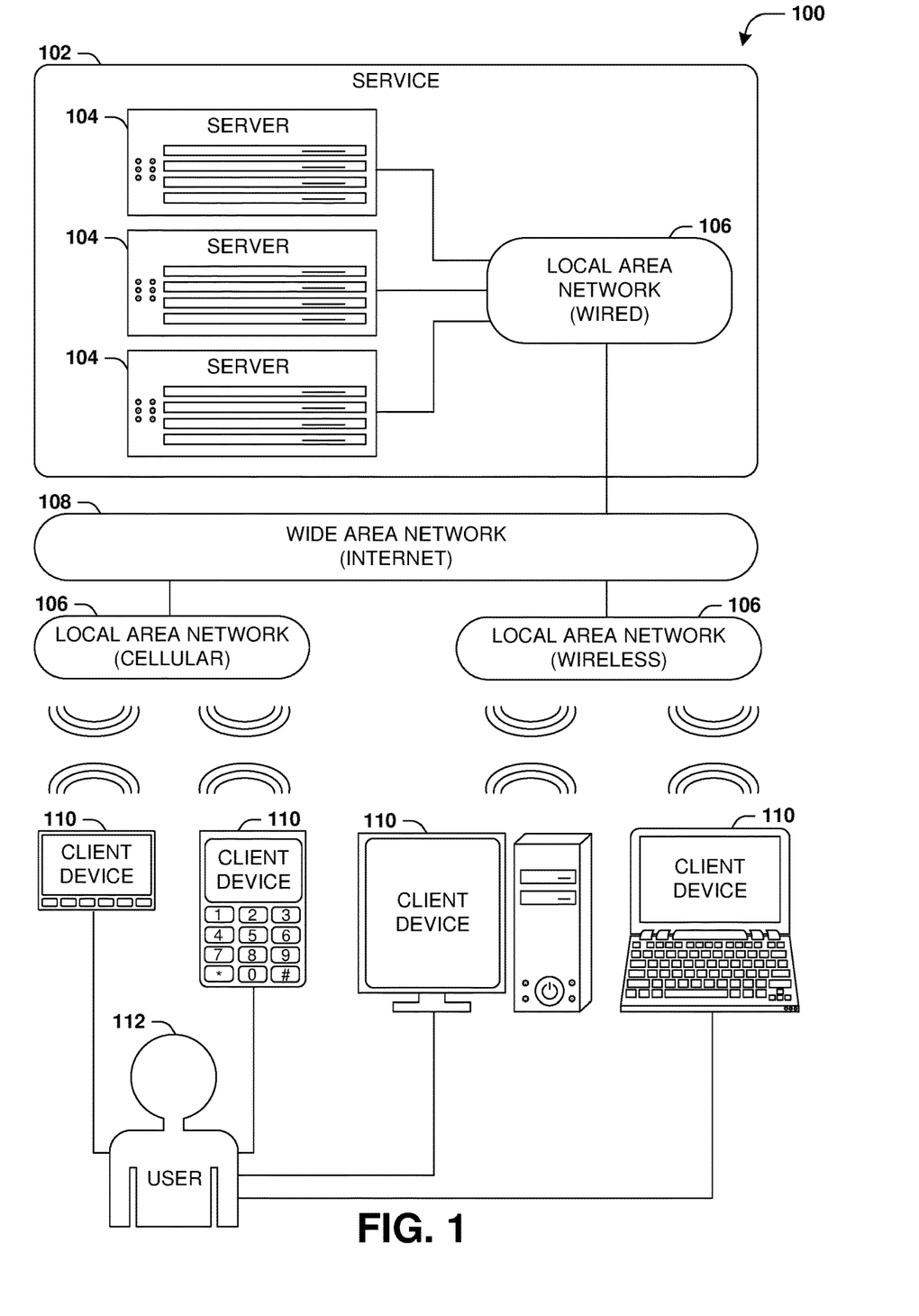
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
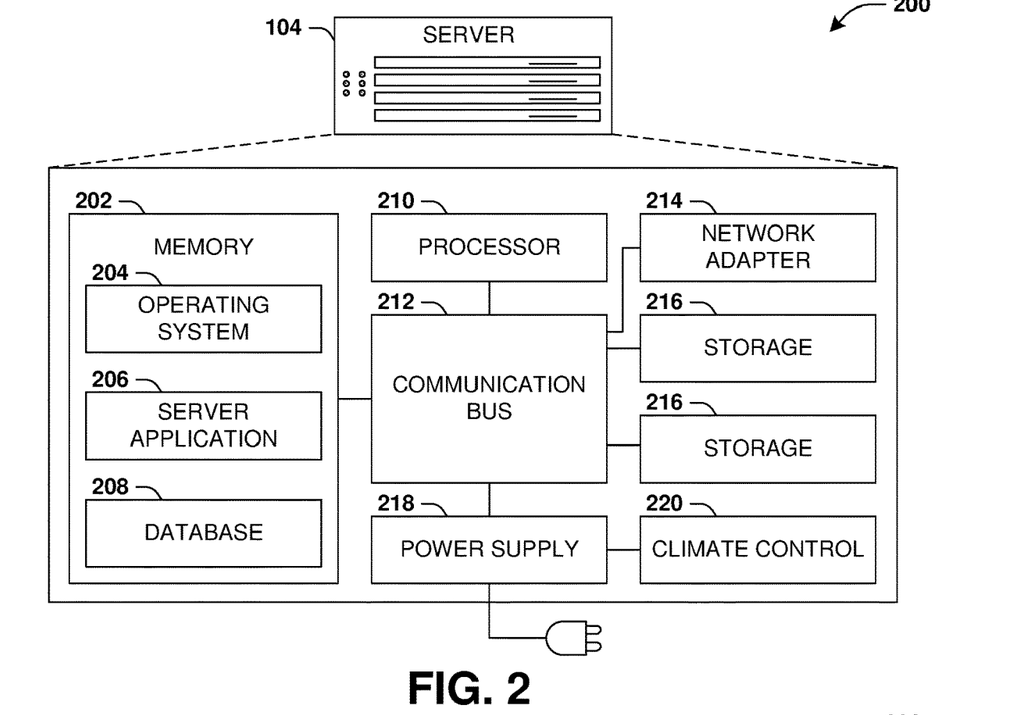
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
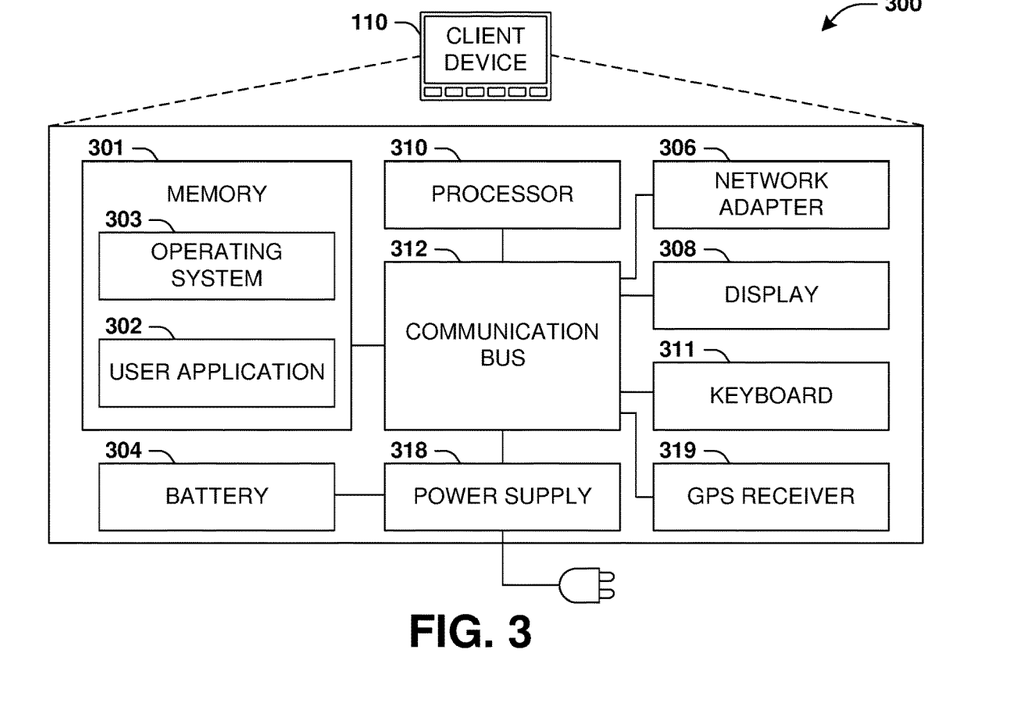
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for message classification are provided. For example, a user may send, receive, and read messages through a message interface associated with a message service. The message service may provide the user with the ability to mark/vote messages as spam, and move such messages to a spam folder. The message service may also employ a spam filter that may attempt to recognize normal ongoing spam campaigns from spammers who have been around awhile, that use the same known malicious content, that use the same internet protocol (IP) addresses that have been blacklisted, etc. However, these spam filters are unable to recognize certain spam campaigns such as where a spammer has hijacked new IP address ranges, uses bot nets, buys new domains through which to send spam, uses randomized malicious content, uses variations in subjects, etc. in order to launch unusual and/or sudden spam campaigns/attacks. Such spam campaigns will not be recognized by the spam filters until after harm has been done because by the time enough spam votes are received for a spam classifier to learn a bad reputation, the spam campaign may have already affected numerous users. No single feature (e.g., a common subject line, common email body content, common sender credentials, etc.) will reveal the complete spam campaign because such spam campaigns use randomized or differing subjects, content, sender credentials, etc. Thus, security of users may become compromised such as where users read and/or take action upon a spam message (e.g., click on a link to malicious content). Also, users may waste time, computing resources, and/or bandwidth accessing the message inbox populated with spam messages that are uninteresting and/or a threat to the user. The message interface may become so cluttered with spam messages that the message interface becomes unwieldy for the user (e.g., the user may have to sift through hundreds of spam emails in order to identify emails of interest).

Accordingly, as provided herein, a campaign detector and a machine learning classifier may be used to discriminate between spam campaigns and other types of messages (e.g., work messages, personal messages, desirable ad campaigns, etc.). In particular, multi-level clustering is used to identify messages that make up a campaign, and a message classifier is used to classify messages based upon features of messages and cluster features of clusters into which such messages are clustered. Because a variety of features aspects (e.g., spam scores of messages within a cluster, subject lines of messages within the cluster, message body content of messages within the cluster, actions users performed upon messages within the cluster, etc.) are used, difficult to detect spam messages and/or campaigns can be quickly and efficiently detected notwithstanding a spammer using randomized and/or differing subject lines, content, sender credentials, etc. Message classification can be expanded to millions or even billions of messages by using a locality sensitive hashing method for scalable clustering with linear complexity and/or using a map reduced framework.

Figure 4:
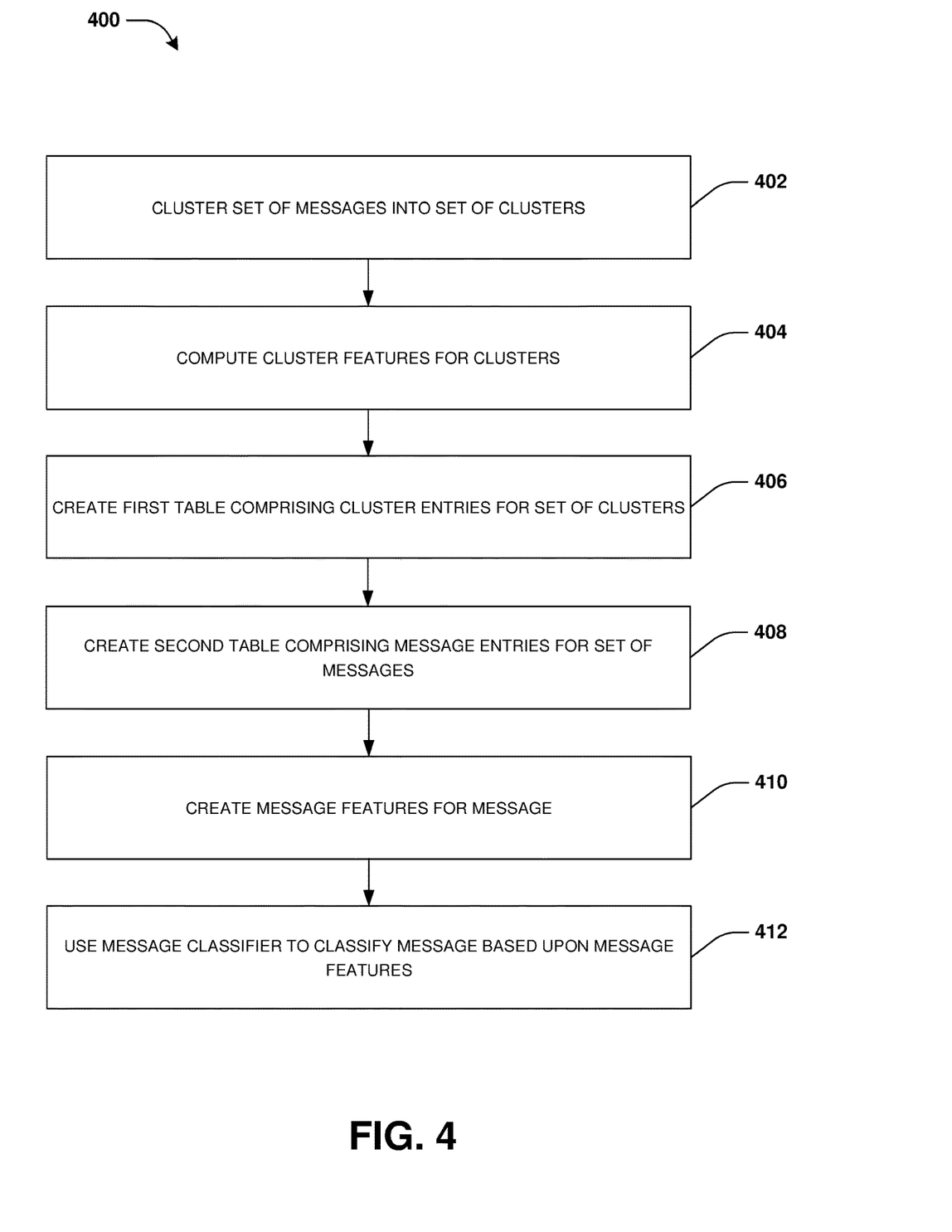
FIG. 4 is a flow chart illustrating an example method for message classification.

An embodiment of classifying messages is illustrated by an example method 400 of FIG. 4. In an example, the method 400 may be implemented by a computing device or a collection of computing devices such as within a computer cluster environment, a cloud computing environment, a distributed network environment, etc. A set of messages, such as emails (e.g., emails that were previously delivered to users or emails that are yet to be delivered to users), may be evaluated for classification (e.g., as spam, safe, work related, personal, newsletter, a threat, etc.) and/or identification of spam campaigns. At 402, the set of messages may be clustered into a set of clusters. In particular, the set of messages may be transformed into a set of bags of words. A bag of words may correspond to a message component (e.g., a first bag of words may comprise words from a subject line of a message, a second bag of words may comprise words from a message body of the message, a third bag of words may comprise information regarding an XML DOM structure space for message body content of the message, a fourth bag of words may comprise recipient information of a recipient of the messages, such as an age, gender, occupation, social network profile information, email usage information, and/or any other public information or information for which the recipient provides affirmative consent that such information may be used such as for message classification and/or filtering, etc.).

The set of bags of words may be transformed into a set of hash descriptions using a hash function. For example, the hash function may be used to transform a bag of words into a min-hash description based upon a number of words (e.g., 5 words or any other number of words) having a minimum hash value (e.g., a locality sensitive hashing method with a min-hash trick, which can be used for clustering messages).

The set of hash descriptions may be grouped (e.g., using a map-reduce framework that parcels out tasks to multiple nodes of a cluster, and organizes results from the nodes into a cohesive output, which can reduce processing time for tasks such as listing and/or counting a number of times words appear within messages or hash descriptions) to cluster messages of the set of messages into a set of clusters. For example, if a first hash description for a first subject line of a first message and a second hash description for a second subject line of a second message are within a similarity threshold, then the first message and the second message (e.g., the messages associated with bags of words that were transformed into the two similar hash descriptions) may be clustered together.

A message may be clustered into a single cluster or multiple clusters (e.g., a message may be clustered into a first cluster with other messages having similar subject lines, and the message may also be clustered into a second cluster with other messages having similar XML DOM structures for message body content). The messages may be clustered within a sender description space (e.g., messages sent by senders with similar attributes such as IP addresses may be clustered together), a subject line space (e.g., messages with similar subject lines may be clustered together), a message body content space (e.g., messages with similar message body content such as similar words, sentence structure, grammar, vocabulary, images, or other embedded content may be clustered together), a user action space (e.g., messages may be clustered based upon having similar user read action features, user reply action features, user forward action features, user delete action features, and/or user spam vote features, such as where messages that are deleted without being read may be clustered together), an XML DOM structure space for message body content (e.g., messages with similar Hypertext Markup Language HTML or other markup language attributes may be clustered together). In this way, messages may be clustered into clusters based upon a variety of features.

At 404, cluster features may be computed for clusters within the set of clusters based upon features of messages within the clusters. In an example, a cluster feature may correspond to a distance (e.g., a diameter of the cluster, such as a max Hadamard distance between two bags of words within the cluster) between a first bag of words of a message within a cluster and a second bag of words of another message within the cluster. In another example, a number of messages within the cluster may be measured as a cluster feature. In another example, a cluster feature may correspond to an aggregation of spam scores for messages within the cluster, recipient characteristic features of recipients of the messages, user action features performed upon the messages by the recipients, message content features of the messages, subject line features of the messages, etc.

At 406, a first table, comprising cluster entries for the set of clusters, may be created. For example, a first cluster entry may correspond to a first cluster (e.g., identified by a cluster identifier) and cluster features of the first cluster. At 408, a second table, comprising message entries for the set of messages, may be created. For example, the second table may comprise a first message entry corresponding to a first message (e.g., identified by a message identifier) and identifiers of clusters to which the first message is assigned. In this way, the second table may be queried using the message identifier to identify the first message entry comprising the identifiers of clusters to which the first message is assigned. The identifiers of the clusters may be used to query the first table in order to identify cluster features of the clusters to which the first message is assigned so that the cluster features can be used for creating message features for the first message.

At 410, message features may be created for a message (e.g., a message that has been delivered to a message inbox, a message that has yet to be delivered to a user's message account, a message residing in any message container, such as a sent folder, an outbox, a deleted folder, a spam folder where a message previously marked as spam may be retroactively classified as non-spam and moved to the message inbox, etc.). The message features may be based upon features of the message (e.g., a subject line feature, a message body feature, an XML DOM structure feature, a sender feature, a recipient feature, and/or other features such as a topic of the message as determined by textual features within the subject line and message body, a topic of content linked to by the message, a topic of an attached for the message, etc.) and/or cluster features of the clusters to which the message is assigned.

A message feature may be created based upon a number of message within a cluster to which the message is assigned (e.g., a large number of very similar messages within a cluster may be indicative of a campaign as opposed to personalized messages). The message feature may be created based upon user actions upon messages within the cluster (e.g., a cluster comprising messages where users delete the messages before reading them may be indicative of uninteresting or spam messages). The message feature may be created based upon subject line features of messages within the cluster (e.g., improper grammar, spelling, and the use of special characters may be indicative of spam). The message feature may be created based upon sender description features of messages within the cluster (e.g., senders using blacklisted IP addresses or domains may be indicative of spammers). The message feature may be created based upon word content of message bodies, attachments, links, etc. of the messages within the cluster (e.g., grammar, spelling, sentence structure, paragraph structure, spam key words, etc.). The message feature may be created based upon message body structures of the messages within the cluster (e.g., XML DOM structure). The message feature may be created based upon spam filter scores for the messages within the cluster (e.g., a spam filter may be used to score the messages as to how likely such messages are spam). Because the message may be assigned to multiple clusters, the message feature may be generated based upon an aggregate of features of the multiple clusters to which the message is assigned.

At 412, a message classifier may be used to classify the message based upon the message feature. In an example, the message may be retroactively classified after the message was delivered to a message inbox or may be classified before potential delivery to a user. In an example, if the message is classified as spam, then the message may be moved from the message inbox to a spam folder. The message classifier may be used to identify a spam campaign based upon one or more clusters comprising messages classified as spam (e.g., subject lines, message bodies, attachments, links, sender addresses, etc. that are used as part of the spam campaign may be identified as correlated together to define the spam campaign).

The message classifier may be trained based upon message features of training messages (e.g., trained to classify messages as spam, non-spam, work, personal, advertising, etc. based upon subject line features, user action features, sender description features, word count of messages bodies, message body structures such as XML DOM structures, etc.). In an example, the message classifier may be trained to use a learned decision rule (e.g., a rule that evaluates message features to determine whether to classify a message as spam or not, such as where certain message features and values of messages features may be weighted to identify a score that is evaluated against a threshold indicative of a certain classification) that is learned using a set of training message data labeled based upon spam indicators. A spam indicator may comprise spam vote information, whether a training message was located within a bulk folder such as a spam folder, whether a training message was retrospectively filtered by another algorithm such as another spam filter, etc. For example, if a training message receives a threshold number of spam votes within a threshold time (e.g., 50 spam votes within 10 days of the training message being sent), then the training message may be designated as spam (e.g., message features of the training message may be used to teach the message classifier as to what message features are indicative of spam). Otherwise, the training message is designated as not spam (e.g., message features of the training message may be used to teach the message classifier as to what message features are indicative of non-spam messages). In an example, a number of positive spam training message examples may be balanced with a number of negative non-spam training message examples by subsampling a ratio of negative non-spam training message examples (e.g., subsample a ratio of 1:500 from negative non-spam training messages).

Figure 5A:
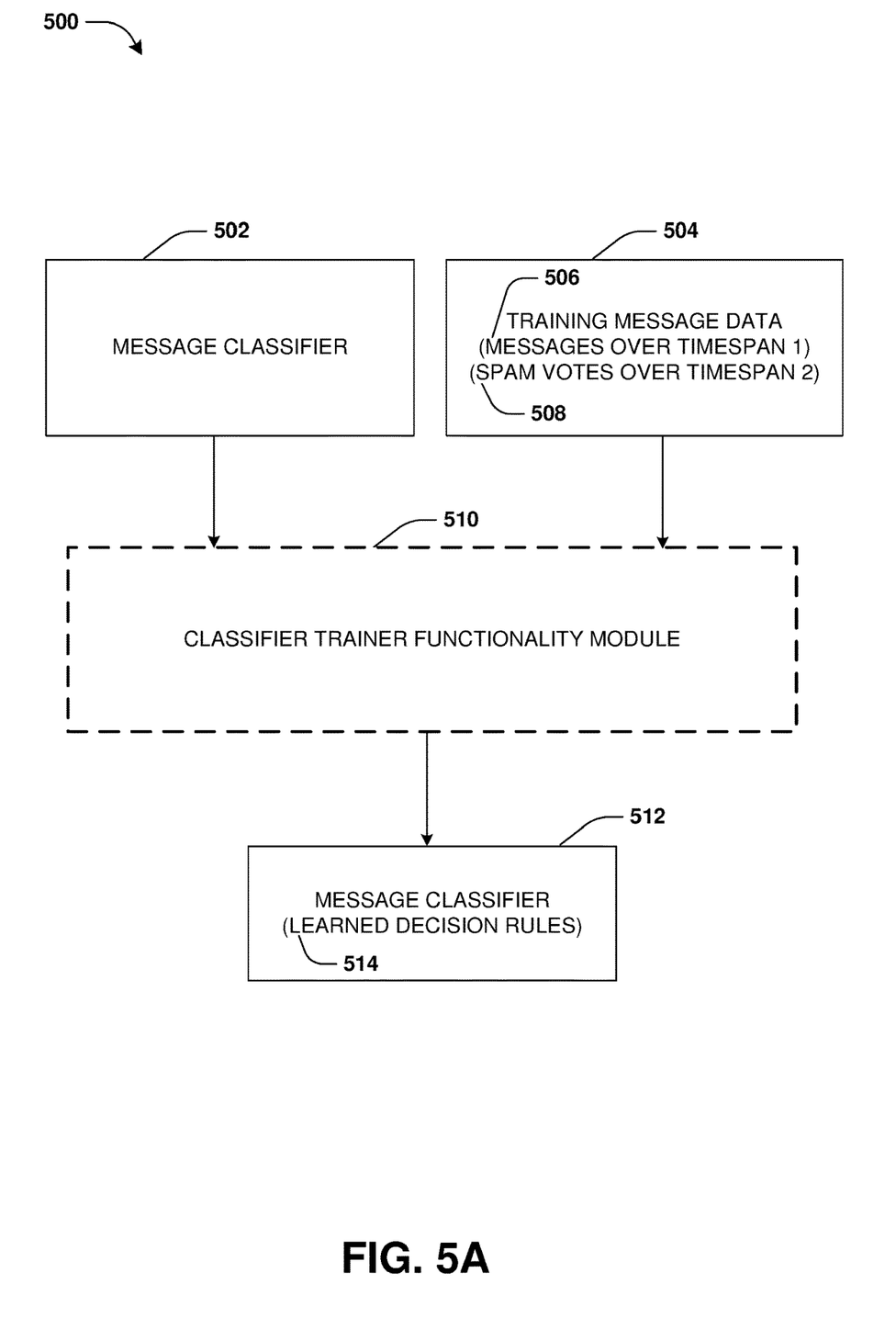
FIG. 5A is a component block diagram illustrating an example system for message classification, where a message classifier is trained.

FIGS. 5A-5E illustrate examples of a system 500 for classifying messages. FIG. 5A illustrates a classifier trainer functionality module 510 configured to train a message classifier 502. The classifier trainer functionality module 510 may acquire training message data 504. For example, messages 506 over a first timespan (e.g., messages received by a messaging service over a 6 hour timespan or any other timespan) may be retrieved. Spam vote data 508 (e.g., users marking messages as spam, users moving messages into a spam folder, or other actions indicative of users treating messages as spam) over a second timespan (e.g., a 10 day timespan or any other timespan from when the messages were sent) may be retrieved. The messages 506 and spam votes 508 may be used as the training message data 504 by the classifier trainer functionality module 510 to train the message classifier 502 to use learned decision rules 514 for classifying messages, resulting in a trained message classifier 512. For example, the spam votes 508 may indicate that a threshold number of spam votes were received for a message within the messages 506 of the training message data 504 (e.g., 200 spam votes). A learned decision rule may be created to classify messages as spam where such messages have similar message features as the message for which the threshold number of spam votes was received. In this way, messages with similar message features as the message may be classified by the trained message classifier 512 as spam (e.g., the trained message classifier 512 is trained to classify messages as spam, non-spam, work, personal, advertising, etc. based upon subject line features, user action features, sender description features, word count of messages bodies, message body structures such as XML DOM structures, and/or other message features of messages having threshold numbers of spam votes 508).

Figure 5B:
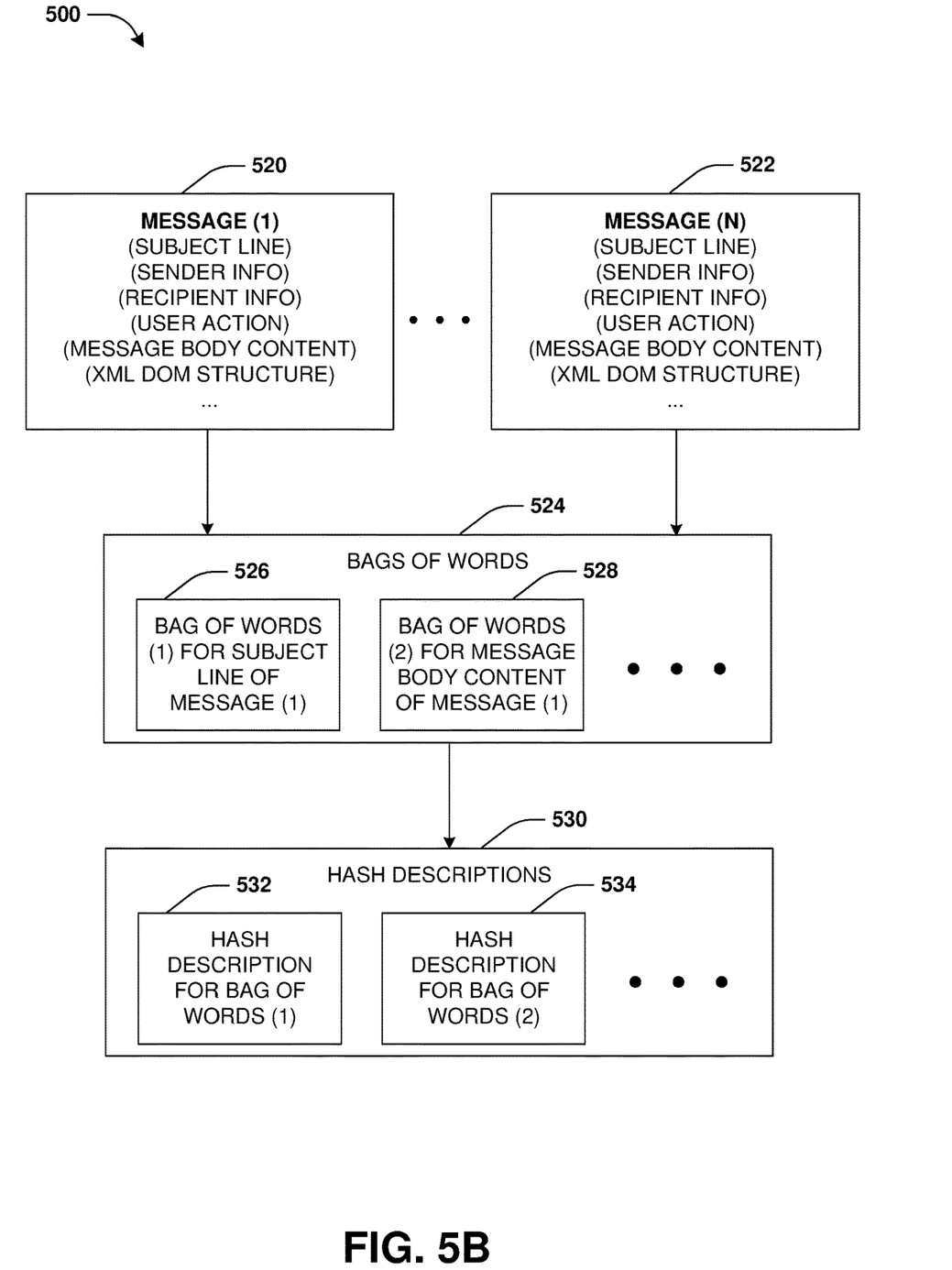
FIG. 5B is a component block diagram illustrating an example system for message classification, where hash descriptions are created from a set of messages.

FIG. 5B illustrates a set of hash descriptions 530 being created based upon a set of messages. For example, the set of messages may comprise a first message 520 with a subject line, sender info (e.g., IP address, domain, etc.), recipient info (e.g., frequency of email service usage, IP address, domain, age, gender, social network profile information, etc.), user action for the first message 520 (e.g., did the user read, delete, mark as spam, reply, forward, or perform other actions upon the first message 520), message body content or attached content (e.g., text, links, an embedded image, an attachment, etc.), an XML DOM structure of message body of the first message 520 (e.g., HTML features), etc. The set of messages may comprise a plurality of messages, such as the first message 520, an nth message 522, etc.

The set of messages may be transformed into bags of words 524, where a bag of words corresponds to a message component (e.g., a subject line, sender information, recipient information, user action information, message body content, XML DOM structure information, etc.). For example, a first bag of words 526 comprises words or other content within a subject line of the first message 520. A second bag of words 528 comprises words or other content of a message body of the first message 520. A third bag of words may comprise words or other content of a subject line of the nth message 522.

The bags of words 524 may be transformed into a set of hash descriptions 530 using a hash function. For example, the hash function may be used to transform the first bag of words 526 into a first hash description 532, such as a min-hash description based upon a number of words (e.g., 5 words or any other number of words) having a minimum hash value. Similarly, the second bag of words 528 may be transformed into a second hash description 534.

Figure 5C:
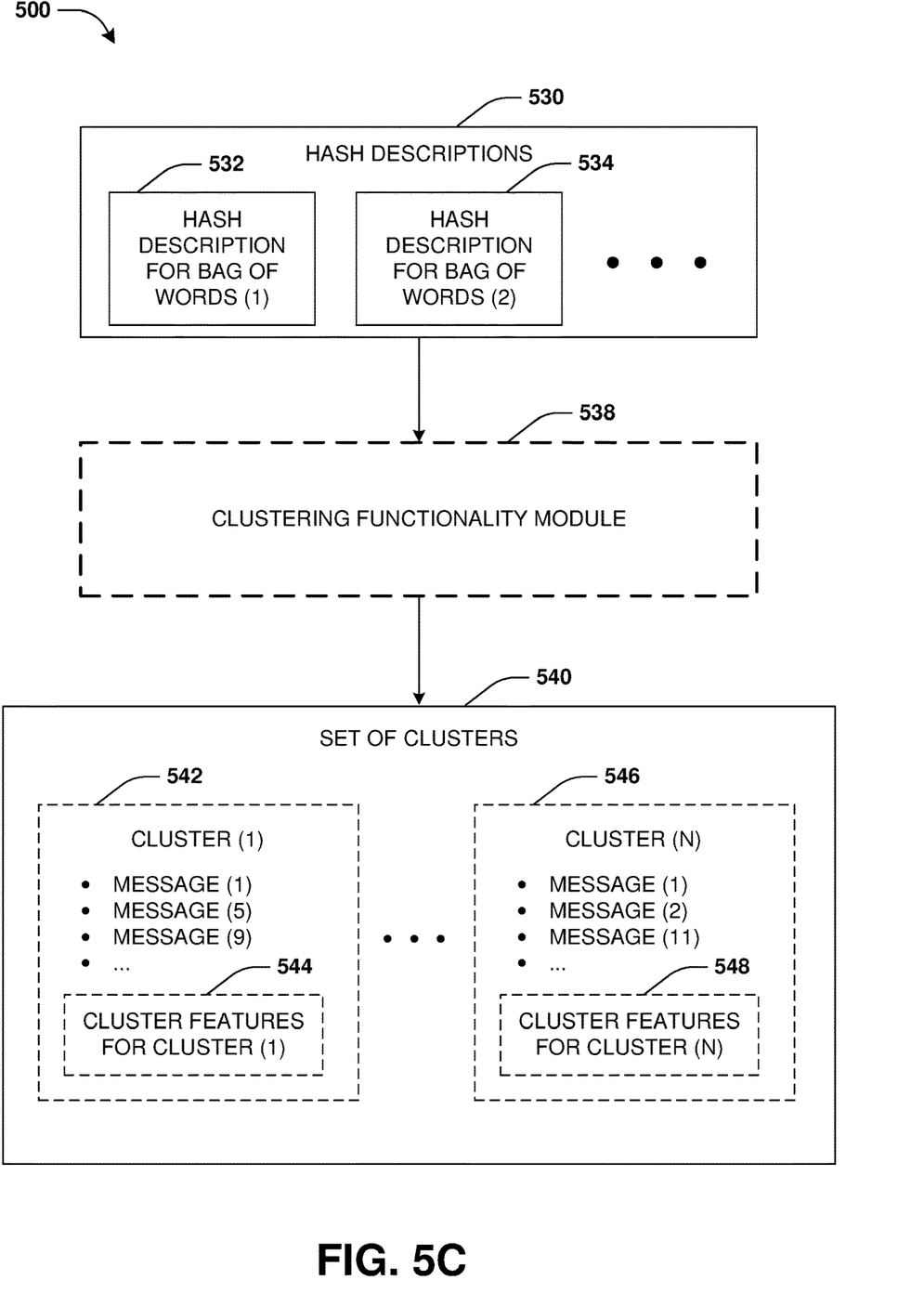
FIG. 5C is a component block diagram illustrating an example system for message classification, where messages are clustered to create a set of clusters.

FIG. 5C illustrates a clustering functionality module 538 used to group the set of hash descriptions 530 to cluster the set of messages into a set of clusters 540. For example, if a hash description for a subject line of a message and a hash description for a subject line of a second message are within a similarity threshold, then the message and the second message (e.g., the messages associated with bags of words that were transformed into the two similar hash descriptions) may be clustered together. In an example, messages may be clustered into one or more clusters corresponding to sender description space, one or more clusters corresponding to a subject line space (e.g., messages with similar subject line features such as words, symbols, grammar, etc. may be clustered together), one or more clusters corresponding to a message body content space (e.g., messages with similar message body features such as words, links, grammar, etc. may be clustered together), one or more clusters corresponding to user action space (e.g., messages that are deleted without being read may be clustered together), one or more clusters corresponding to an XML DOM structure space (e.g., messages with similar HTML features may be clustered together), etc.

In an example, messages, such as a first message, a fifth message, a ninth message, and/or other messages, associated with hash descriptions of subject lines that are within a similarity threshold may be clustered into a first cluster 542. Messages, such as the first message, a second message, an eleventh message, and/or other messages, associated with hash descriptions of XML DOM structures that are within a similarity threshold may be clustered into a second cluster 546.

Cluster features may be computed for the clusters based upon features of messages within such clusters. For example, first cluster features 544 may be computed for the first cluster 542 based upon features of the first message, the fifth message, the ninth message, and/or other messages within the first cluster 542 (e.g., user action features, recipient characteristic features, spam scores, subject line features, message content features, etc. may be aggregated together to compute the first cluster features 544). Nth cluster features 548 may be computed for the nth cluster 546 based upon features of the first message, the second message, the eleventh message, and/or other messages within the nth cluster 546 (e.g., user action features, recipient characteristic features, spam scores, subject line features, message content features, etc. may be aggregated together to compute the nth cluster features 548).

Figure 5D:
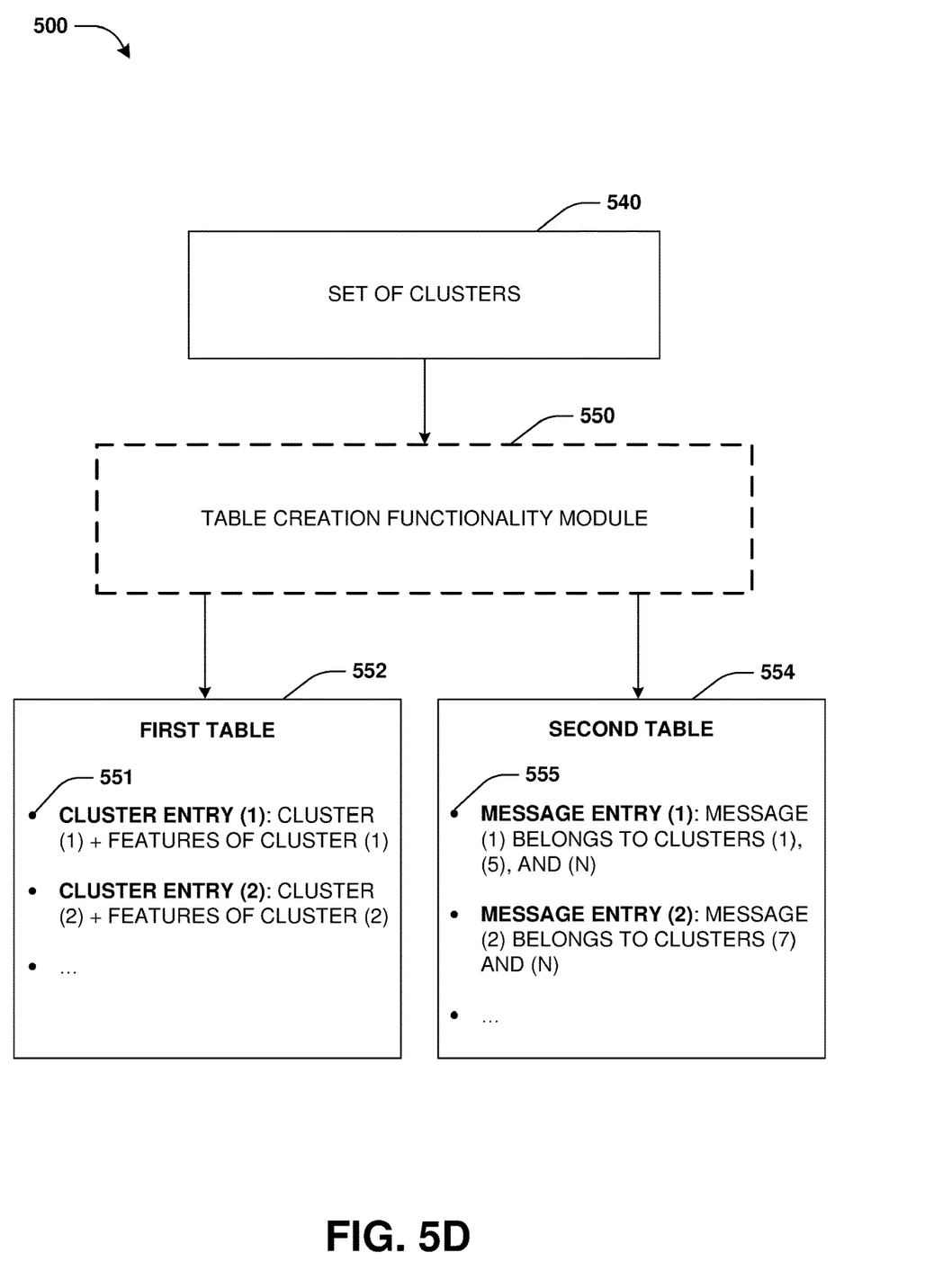
FIG. 5D is a component block diagram illustrating an example system for message classification, where a first table and a second table are created.

FIG. 5D illustrates a table creation functionality module 550 configured to create a first table 552 and a second table 554 based upon the set of clusters 540. The first table 552 may be populated with cluster entries for clusters within the set of clusters 540. For example, a first cluster entry 551 may be created for the first cluster 542 of the set of clusters 540, a second cluster entry may be created for a second cluster of the set of clusters 540, etc. The first cluster entry 551 may comprise the first cluster features 544 of the first cluster 542. The second cluster entry may comprise second cluster features of the second cluster.

The second table 554 may be populated with message entries corresponding to the set of messages. For example, a first message entry 555 may be created for the first message, a second message entry may be created for the second message, etc. The first message entry 555 may comprise identifiers of clusters to which the first message is assigned, such as to the first cluster 542, a fifth cluster, and the nth cluster 546. The second message entry may comprise identifiers of clusters to which the second message is assigned, such as to a seventh cluster and the nth cluster 546. In this way, the second table 554 may be queried using a message identifier to identify a message entry comprising identifiers of clusters to which the message is assigned. The identifiers of the clusters may be used to query the first table 552 in order to identify cluster features of the clusters to which the message is assigned so that the cluster features can be used for creating message features for the message.

Figure 5E:
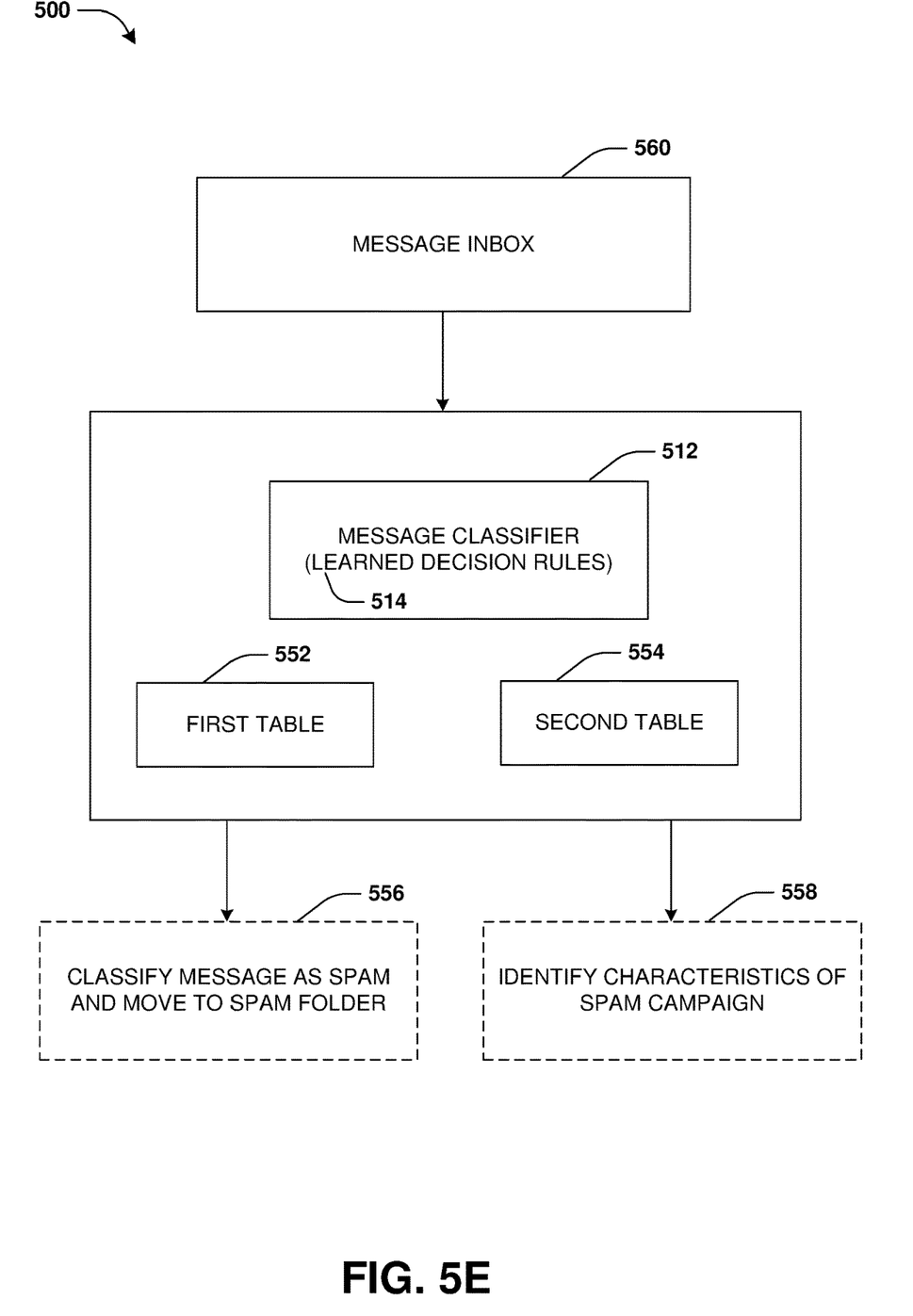
FIG. 5E is a component block diagram illustrating an example system for message classification.

FIG. 5E illustrates the trained message classifier 512 classifying messages and/or identifying spam campaigns. For example, the trained message classifier 512 may have been trained to classify messages based upon message features, such as described in FIG. 5A. For example, the trained message classifier 512 may utilize the learned decision rules 514 to retroactively classify messages within a message inbox 560. The trained message classifier 512 may evaluate a message within the message inbox 560 by clustering the message with other messages based upon message features of the messages. The first table 552, comprising cluster entries corresponding to clusters and cluster features of clusters, and the second table 554, corresponding to messages and identifiers of clusters to which such messages are assigned, may be created based upon the clusters of messages. Message features of the message may be created using the first table 552 and the second table 554. For example, the second table 554 may be queried using a message identifier of the message to identify a message entry comprising identifiers of clusters to which the message is assigned. The identifiers of the clusters may be used to query the first table 552 in order to identify cluster features of the clusters to which the message is assigned. The cluster features and features of the message are used to create message features for the message.

The trained message classifier 512 uses the learned decision rules 514 to classify the message, such as classifying 556 the message as spam (e.g., the message features may be indicative of features of spam messages). The message may be moved from the message inbox 560 to a spam folder. The trained message classifier 512 may utilize the cluster of messages, the first table 552, and/or the second table 554 to identify characteristics of a spam campaign 558.

Figure 6:
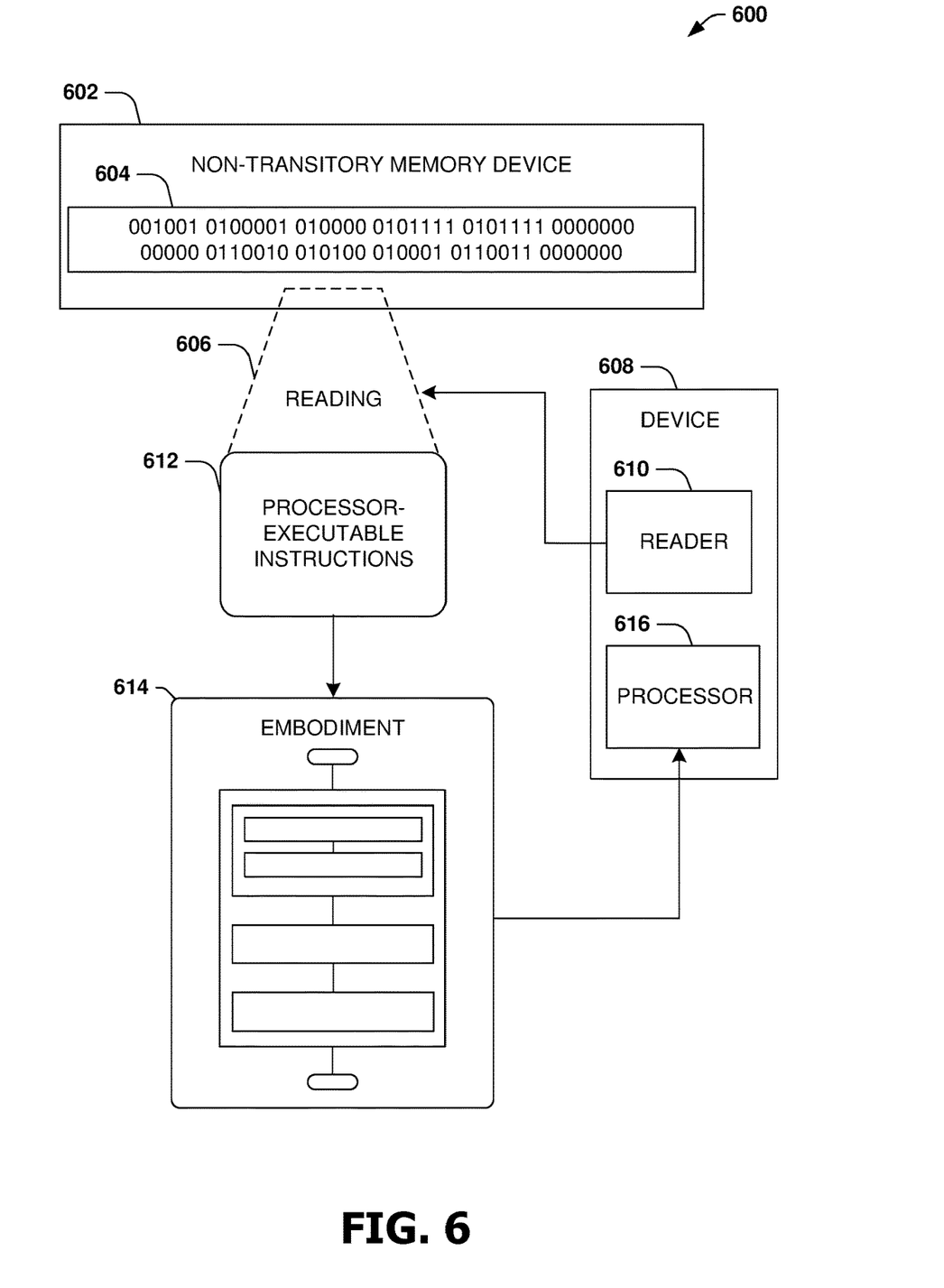
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of message classification, the method comprising:
executing, on a processor of a computing device, instructions that cause the computing device to perform operations, the operations comprising:
clustering messages into clusters based upon hash descriptions of bags of words corresponding to message components of the messages;
computing cluster features for the clusters based upon one or more features of one or more messages within the clusters;
creating a first table comprising cluster entries for the clusters, wherein a first cluster entry of a first cluster is populated with one or more cluster features derived from one or more message components of at least one message clustered within the first cluster;
creating a second table populated with message entries for the messages, wherein a first message entry, of the message entries in the second table, for a first message is populated with identifiers of one or more clusters into which the first message is clustered;
querying the first table and the second table to create one or more message features for a second message based upon one or more second features of the second message and one or more second cluster features of one or more second clusters to which the second message is assigned;
training a message classifier to use a learned decision rule that is trained using a set of training message data labeled based upon one or more spam indicators;
balancing a number of positive spam training message examples with a number of negative non-spam training message examples, in association with the message classifier, by subsampling a ratio of negative non-spam training message examples; and
classifying the second message based upon the one or more message features and the learned decision rule of the message classifier.

2. The method of claim 1, wherein the computing cluster features comprises:
measuring a distance between a first bag of words and a second bag of words within a cluster to create a cluster feature.

3. The method of claim 1, wherein the computing cluster features comprises:
measuring a number of messages within a cluster to create a cluster feature.

4. The method of claim 1, wherein the computing cluster features comprises:
aggregating spam scores for messages within a cluster, recipient characteristic features of recipients of the messages within the cluster, user action features performed upon the messages within the cluster by the recipients, message content features of the messages within the cluster, and subject line features of the messages within the cluster to create the cluster features.

5. The method of claim 1, wherein the clustering comprises:
clustering the messages within a sender description space, a subject line space, a message body content space, a user action space, and an extensible markup language (XML) document object model (DOM) structure space for message body content.

6. The method of claim 1, wherein the clustering comprises:
clustering the messages based upon a user read action feature, a user reply action feature, a user forward action feature, a user delete action feature, and a user spam vote feature.

7. The method of claim 1, comprising:
transforming, using a hash function, a bag of words into a min-hash description based upon a number of words having a minimum hash value.

8. The method of claim 1, comprising:
retroactively classifying the second message after the second message was delivered to a message inbox.

9. The method of claim 8, comprising:
responsive to classifying the second message as spam, moving the second message from the message inbox to a spam folder.

10. The method of claim 1, wherein the clustering comprises:
utilizing a locality sensitive hashing technique for clustering the messages.

11. The method of claim 1, wherein the clustering comprises:
clustering the first message into both the first cluster and into a second cluster.

12. The method of claim 1, comprising:
if a training message receives a spam vote spam indicator within a threshold timespan, then designating the training message as spam, otherwise, designating the training message as not spam.

13. The method of claim 11,
wherein identifiers of the first cluster and the second cluster are populated within the first message entry.

14. The method of claim 1, comprising:
using the message classifier to identify a spam campaign.

15. A computing device comprising:
a processor; and
memory comprising processor-executable instructions that when executed by the processor cause performance of operations, the operations comprising:
clustering messages into clusters based upon features of the messages;
computing cluster features for the clusters based upon one or more features of one or more messages within the clusters;
creating a first table comprising cluster entries for the clusters, wherein a first cluster entry of a first cluster is populated with one or more cluster features derived from one or more message components of at least one message clustered within the first cluster;
creating a second table populated with message entries for the messages, wherein a first message entry, of the message entries in the second table, for a first message is populated with identifiers of one or more clusters into which the first message is clustered;
querying the first table and the second table to create one or more message features for a second message based upon one or more second features of the second message and one or more second cluster features of one or more second clusters to which the second message is assigned;

training a message classifier to use a learned decision rule that is trained using a set of training message data labeled based upon one or more spam indicators;

balancing a number of positive spam training message examples with a number of negative non-spam training message examples, in association with the message classifier, by subsampling a ratio of negative non-spam training message examples; and classifying the second message based upon the one or more message features and the learned decision rule of the message classifier.

16. The computing device of claim 15, wherein the one or more message features of the second message are created based upon a number of messages within a cluster to which the second message is assigned, user actions upon messages within the cluster, subject line features of the messages within the cluster, sender description features of senders of the messages within the cluster, word content of message bodies of the messages within the cluster, message body structures of the messages within the cluster, and spam filtering scores for the messages within the cluster.

17. The computing device of claim 15, wherein the operations comprise:

generating a message feature based upon an aggregate of features of two or more clusters to which the second message is assigned.

18. A non-transitory machine readable medium having stored thereon processor-executable instructions that when executed cause performance of operations, the operations comprising:

clustering messages into clusters;

computing cluster features for the clusters based upon one or more features of one or more messages within the clusters;

creating a first table comprising cluster entries for the clusters, wherein a first cluster entry of a first cluster is populated with one or more cluster features derived from one or more message components of at least one message clustered within the first cluster;

creating a second table populated with message entries for the messages, wherein a first message entry, of the message entries in the second table, for a first message is populated with identifiers of one or more clusters into which the first message is clustered;

querying the first table and the second table to create one or more message features for a second message based upon one or more second features of the second message and one or more second cluster features of one or more second clusters to which the second message is assigned;

training a message classifier to use a learned decision rule that is trained using a set of training message data labeled based upon one or more spam indicators;

balancing a number of positive spam training message examples with a number of negative non-spam training message examples, in association with the message classifier, by subsampling a ratio of negative non-spam training message examples; and classifying the second message based upon the one or more message features and the learned decision rule of the message classifier.

19. The non-transitory machine readable medium of claim 18, wherein the computing cluster features comprises:

measuring a distance between a first bag of words and a second bag of words within a cluster to create a cluster feature.

20. The non-transitory machine readable medium of claim 18, wherein the operations comprise:

retroactively classifying the second message after the second message was delivered to a message inbox.

* * * * *